US010194091B2

(12) United States Patent
Nashizawa

(10) Patent No.: US 10,194,091 B2
(45) Date of Patent: Jan. 29, 2019

(54) IMAGE CAPTURING APPARATUS, CONTROL METHOD THEREFOR, PROGRAM, AND RECORDING MEDIUM

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 15/372,186

(22) Filed: Dec. 7, 2016

(65) Prior Publication Data

US 2017/0171446 A1    Jun. 15, 2017

(30) Foreign Application Priority Data

Dec. 15, 2015  (JP) ................................ 2015-244391

(51) Int. Cl.
| H04N 5/235 | (2006.01) |
| G06K 9/46 | (2006.01) |
| G06K 9/62 | (2006.01) |
| G06T 5/00 | (2006.01) |
| H04N 5/265 | (2006.01) |
| G06T 5/50 | (2006.01) |

(52) U.S. Cl.
CPC ......... *H04N 5/2352* (2013.01); *G06K 9/4661* (2013.01); *G06K 9/6215* (2013.01); *G06T 5/007* (2013.01); *G06T 5/50* (2013.01); *H04N 5/265* (2013.01); *G06T 2207/20208* (2013.01); *G06T 2207/20221* (2013.01); *H04N 5/2355* (2013.01)

(58) Field of Classification Search
CPC .............................. G06T 5/007; H04N 5/2352
See application file for complete search history.

(56) References Cited

U.S. PATENT DOCUMENTS

| 9,357,138 B2 * | 5/2016 | Nashizawa | .......... H04N 5/2355 |
| 9,571,742 B2 * | 2/2017 | Watanabe | ............ H04N 5/2353 |

FOREIGN PATENT DOCUMENTS

| JP | 4402710 B2 | 1/2010 |
| JP | 5257487 B2 | 8/2013 |

* cited by examiner

*Primary Examiner* — Gary C Vieaux
(74) *Attorney, Agent, or Firm* — Canon U.S.A., Inc. I.P. Division

(57) ABSTRACT

An image capturing apparatus capable of high dynamic range shooting for compositing a plurality of images captured with different exposures in temporarily continuous frames includes: an image capturing unit configured to repeatedly capture a relatively-low-exposure image and a relatively-high-exposure image in temporarily continuous frames; an image generation unit configured to generate a first image obtained by correcting the low-exposure image on a basis of reference exposure and a second image obtained by correcting the high-exposure image on a basis of the reference exposure; a calculation unit configured to calculate reference exposure, which is used for performing image capturing of a subsequent frame, on a basis of the first image and the second image; and a correction unit configured to correct exposure conditions, under which a relatively-low-exposure image and a relatively-high-exposure image in a subsequent frame are captured, on a basis of the reference exposure calculated by the calculation unit.

19 Claims, 16 Drawing Sheets

FIG. 3

| 11 | 12 | 13 | 14 | 15 | 16 | 17 | 18 | 19 | Y1 |
|----|----|----|----|----|----|----|----|----|----|
| 21 | 22 | 23 | 24 | 25 | 26 | 27 | 28 | 29 | Y2 |
| 31 | 32 | 33 | 34 | 35 | 36 | 37 | 38 | 39 | Y3 |
| 41 | 42 | 43 | 44 | 45 | 46 | 47 | 48 | 49 | Y4 |
| 51 | 52 | 53 | 54 | 55 | 56 | 57 | 58 | 59 | Y5 |
| 61 | 62 | 63 | 64 | 65 | 66 | 67 | 68 | 69 | Y6 |
| 71 | 72 | 73 | 74 | 75 | 76 | 77 | 78 | 79 | Y7 |
| X1 | X2 | X3 | X4 | X5 | X6 | X7 | X8 | X9 |    |

|  |  | OVEREXPOSURE | | | |
|---|---|---|---|---|---|
|  |  | 0 EV | 1 EV | 2 EV | 3 EV |
| UNDEREXPOSURE | 0 EV | 0.5 : 0.5 | 0.67 : 0.33 | 0.8 : 0.2 | 0.89 : 0.11 |
|  | −1 EV | 0.33 : 0.67 | 0.5 : 0.5 | 0.67 : 0.33 | 0.8 : 0.2 |
|  | −2 EV | 0.2 : 0.8 | 0.33 : 0.67 | 0.5 : 0.5 | 0.67 : 0.33 |
|  | −3 EV | 0.11 : 0.89 | 0.2 : 0.8 | 0.33 : 0.67 | 0.5 : 0.5 |

IMAGE CAPTURING APPARATUS, CONTROL METHOD THEREFOR, PROGRAM, AND RECORDING MEDIUM

BACKGROUND OF THE INVENTION

Field of the Invention

The present disclosure relates to an image capturing apparatus and a control method therefor, and particularly relates to an image capturing apparatus capable of shooting (high dynamic range shooting) for generating a high dynamic range image and a control method therefor.

Description of the Related Art

A technique called high dynamic range (HDR) composition for compositing a plurality of images captured with different exposure amounts (underexposure and overexposure) to expand a dynamic range of an image has been known. With this technique, by compositing standard exposure portions in the images, blown-out highlights and blocked-up shadows can be suppressed, and an image having a favorable tone from a dark portion to a bright portion can be obtained.

The HDR composition (HDR moving image capturing) is able to be applied to moving image capturing when image capturing is repeated with different exposures in an alternating manner, for example, in order to acquire images with different exposures (underexposure and overexposure) for each frame of a moving image. However, when the HDR moving image capturing is performed under exposure conditions of underexposure and overexposure relative to standard exposure fixed, there is no difficulty in a case of a scene having a great brightness difference, but in a case of a scene with a small brightness difference, the dynamic range is so wide that contrast of an image obtained by compositing an underexposure image and an overexposure image is reduced. Therefore, a bright portion and a dark portion of the scene are detected and a detection result thereof is fed back to the exposure conditions of the underexposure image and the overexposure image for performing automatic control. In this case, since values of the exposure conditions of the underexposure image and the overexposure image are not always symmetrical with respect to the standard exposure, an exposure difference between the standard exposure and the underexposure and an exposure difference between the standard exposure and the overexposure are not the same in some cases.

When HDR moving image capturing is performed by composting three (standard-exposure, underexposure, and overexposure) images, hardware allowing high-speed reading, by which image capturing is able to be performed at 90 frames per second (90 fps) is required to generate a moving image having 30 frames per second (30 fps). Thus, it is desired to realize the HDR moving image capturing with two (underexposure and overexposure) images.

Under such circumstances, Japanese Patent No. 4402710 describes a method for performing pre-photographing before actual photographing of a still image in HDR composition, obtaining a histogram of luminance from the image obtained by the pre-photographing, and determining standard exposure to take a balance between blown-out highlights and blocked-up shadows. Japanese Patent No. 5257487 describes that a histogram of luminance of a composite image obtained by compositing an underexposure image and an overexposure image is checked, and when the histogram is inappropriate, the underexposure or the overexposure is corrected, and that a starting time of exposure correction is considered by timer processing in order to suppress a variation.

SUMMARY OF THE INVENTION

At least one embodiment of an image capturing apparatus that repeatedly acquires a plurality of images used for high dynamic range composition and having different exposures, includes: an image capturing unit that captures a subject in order to continuously and repeatedly acquire a low-exposure image and a high-exposure image whose exposure is relatively high compared to the low-exposure image; an image generation unit that generates a first image obtained by correcting the low-exposure image on a basis of a first reference exposure and a second image obtained by correcting the high-exposure image on a basis of the first reference exposure; and a setting unit that sets exposure conditions of a low-exposure image and a high-exposure image whose exposure is relatively high compared to the low-exposure image, which are used for performing image capturing of the subject later, on a basis of the first image and the second image.

According to other aspects of the present disclosure, one or more additional image capturing apparatuses, one or more controlling methods, one or more programs and one or more storage mediums for use with same are discussed herein. Further features of the present disclosure will become apparent from the following description of exemplary embodiments with reference to the attached drawings.

BRIEF DESCRIPTION OF THE DRAWINGS

FIG. 3 illustrates at least one example of an AE sensor 6 of Exemplary Embodiment 1.

DESCRIPTION OF THE EMBODIMENTS

Exemplary embodiments of the disclosure will be described in detail below. The exemplary embodiments described below are merely examples for practicing one or more features of the invention. The exemplary embodiments should be properly modified or changed depending on a structure of an apparatus to which the disclosure is applied and various conditions. The invention should not be limited to the following exemplary embodiments. Also, parts of the exemplary embodiments to be described later may be properly combined.

In the following exemplary embodiment, an example in which a digital camera capable of acquiring a still image or a moving image by high dynamic range composition is applied as an image capturing apparatus will be described. In the following description, acquisition of a moving image based on high dynamic range composition is referred to as HDR moving image capturing. Note that, though the digital camera is exemplified as the image capturing apparatus in the present exemplary embodiment, the image capturing apparatus is applicable not only to an apparatus, such as a digital camera, whose main purpose is image capturing but also any apparatus, which contains an image capturing apparatus or to which an image capturing apparatus is externally connected, such as a mobile phone, a smartphone (including a watch-type or glass-type information terminal) as one kind thereof, a tablet terminal, a personal computer, or a game machine. Therefore, an "image capturing apparatus" in the present specification is intended to include any electronic apparatus having an image capturing function.

<Apparatus structure> First, a structure and a function of an image capturing apparatus of the present exemplary embodiment will be described with reference to FIG. 1.

Figure 1:
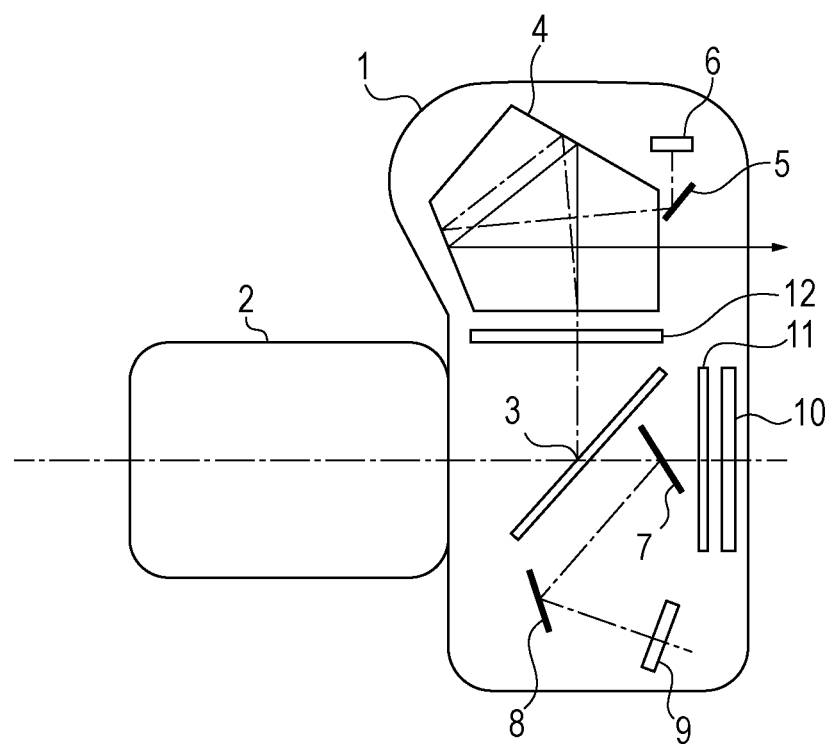
FIG. 1 is a cross-sectional view illustrating an internal configuration of an image capturing apparatus of the present exemplary embodiment.

FIG. 1 is a cross-sectional view illustrating arrangement of mainly optical members, sensors, and the like of the image capturing apparatus according to the present exemplary embodiment. The image capturing apparatus of the present exemplary embodiment is a so-called digital single lens reflex camera with an interchangeable lens, and has a camera body 1 and an interchangeable lens 2.

In the camera body 1, an image sensor 10 is, for example, a CMOS image sensor or a CCD image sensor, and have multiple pixels (accumulation-type photoelectric conversion elements) arranged thereon. A mechanical shutter 11 provided near the front of the image sensor 10 controls exposure timing and an exposure time of the image sensor 10. A semi-transmissive main mirror 3 and a first reflection mirror 7 which is arranged behind the main mirror 3 move to an upper portion at the time of image capturing. Light flux reflected by the first reflection mirror 7 is further reflected by a second reflection mirror 8 so as to enter a focus detection sensor 9. The focus detection sensor 9 may be an image sensor in which the number of pixels is smaller than that of the image sensor 10, for example. The first reflection mirror 7, the second reflection mirror 8, and the focus detection sensor 9 are components for performing focus detection with a phase-difference detection method at any position on an imaging plane.

A photometric sensor (AE sensor) 6 receives light flux reflected by a pentaprism 4 and a third reflection mirror 5. Similarly to the focus detection sensor 9, the AE sensor 6 may also be an image sensor in which the number of pixels is less than that of the image sensor 10. As illustrated in FIG. 3, the AE sensor 6 is able to divide a light reception unit into a plurality of regions so that luminance information of a subject is able to be output for each region. Note that, the example in FIG. 3 indicates a case where the reception portion is divided into 63 regions, 9 vertically×7 horizontally, but there is no limitation to the number of divided regions. Note that, in addition to the pixels arranged in the light reception unit, an amplifier circuit for pixel signals, a peripheral circuit for signal processing, and the like are formed in the image sensor 10.

A finder optical system is configured by the pentaprism 4. Although it is not illustrated in FIG. 1, a subject image reflected by the pentaprism 4 is viewable through an eyepiece. Among light beams reflected by the main mirror 3 and diffused by a focusing plate 12, a portion that is off of a light axis enters the AE sensor 6. The interchangeable lens 2 performs information communication with the camera body 1 as needed through contact units 29 and 50 on a lens mount provided in the camera body 1. Note that, at the time of live-view display and moving image recording, the main mirror 3 is always in a flipped-up state, and hence exposure control and focus adjustment control are performed by using image information of the imaging plane.

Figure 2:
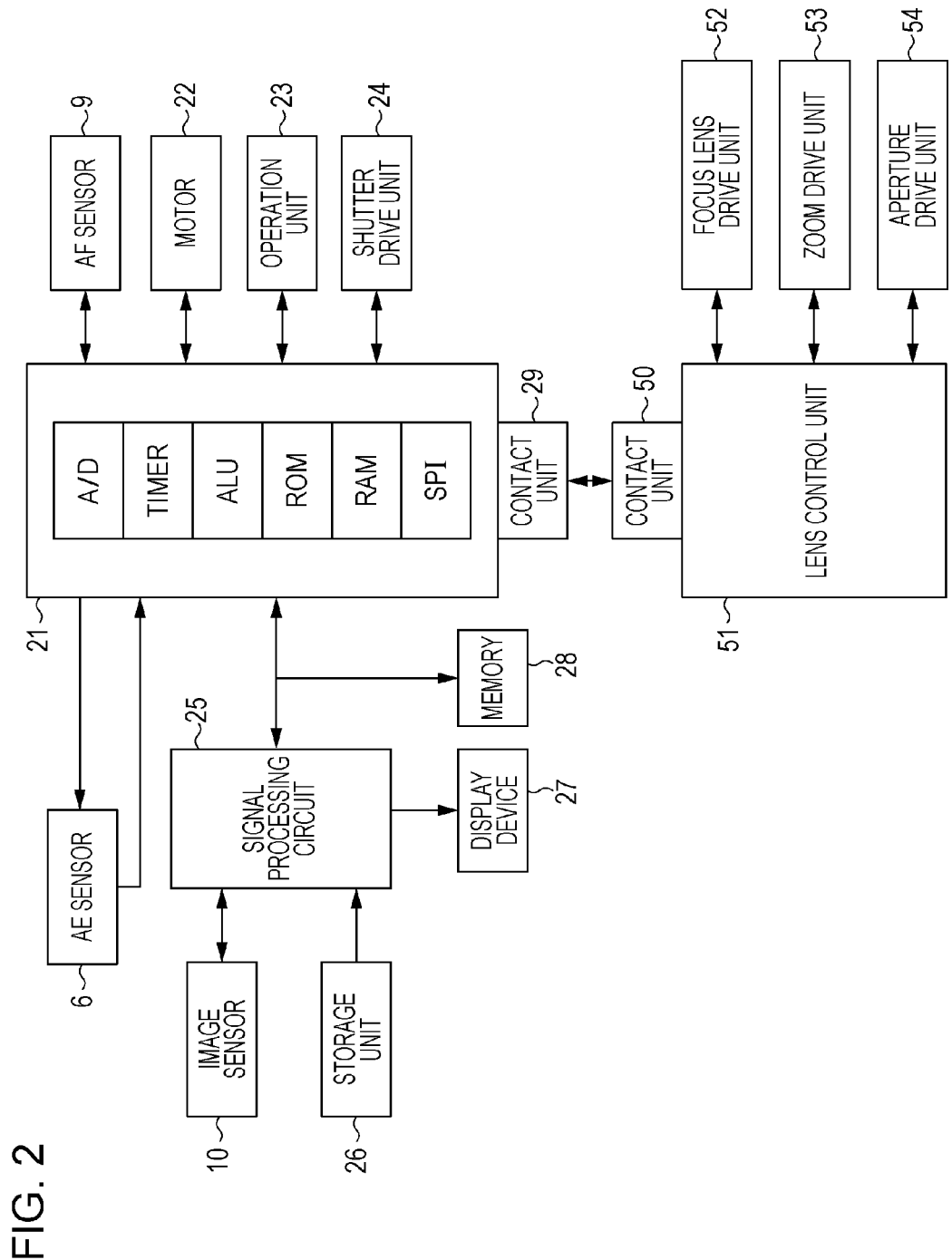
FIG. 2 is a block diagram illustrating an electrical configuration of the image capturing apparatus of the present exemplary embodiment.

FIG. 2 is a block diagram illustrating a configuration example of electrical circuits of the camera body 1 and the interchangeable lens 2 therefor illustrated in FIG. 1. In the camera body 1, a control unit 21 is, for example, a one-chip microprocessor with an ALU (Arithmetic and Logic Unit), a ROM, a RAM, an A/D converter, a timer, a serial communication port (SPI), and the like built in. The control unit 21 controls operations of the camera body 1 and the interchangeable lens 2 by executing a program stored in the ROM, for example. A specific operation of the control unit 21 will be described later.

Output signals from the focus detection sensor 9 and the AE sensor 6 are connected to an A/D converter input terminal of the control unit 21. A signal processing circuit 25 controls the image sensor 10 in accordance with instructions from the control unit 21, applies A/D conversion and signal processing to the signals output by the image sensor 10, and obtains an image signal. Moreover, when the obtained image signal is to be recorded, the signal processing circuit 25 performs necessary image processing, such as compression and compositing. A memory 28 is a DRAM or the like, and is used as a work memory when various types of signal processing are performed by the signal processing circuit 25, and is used as a VRAM when an image is displayed on a display device 27 described below. The display device 27 is configured by a liquid crystal display panel or the like, and displays information such as camera setting values, messages, and menu screens, and captured images. The display device 27 is controlled by instructions from the control unit 21. A storage unit 26 is a non-volatile memory, for example, such as a flash memory, and signals of captured images are input from the signal processing circuit 25.

A motor 22 moves the main mirror 3 and the first reflection mirror 7 up and down and charges the mechanical shutter 11 under control of the control unit 21. An operation unit 23 is a group of input devices such as switches for a user to operate the camera. A release switch for giving an instruction to start an image capturing preparation operation or an image capturing operation, an image capturing mode selection switch for selecting an image capturing mode, direction keys, a determination key, and the like are included in the operation unit 23. The contact unit 29 is a contact for performing communication with the interchangeable lens 2, and an input/output signal of a serial communication port in the control unit 21 is connected thereto. A shutter drive unit 24 is connected to an output terminal of the control unit 21 and drives the mechanical shutter 11.

The contact unit 50 that is paired with the contact unit 29 is provided in the interchangeable lens 2. A lens control unit 51, which is a one-chip microprocessor similar to the control unit 21, is connected to the contact unit 50 and is able to communicate with the control unit 21. The lens control unit 51 executes a program stored in the ROM, for example, and controls the operation of the interchangeable lens 2 on the basis of instructions from the control unit 21. In addition, the lens control unit 51 notifies the control unit 21 of information such as a state of the interchangeable lens 2. A focus lens drive unit 52 is connected to an output terminal of the lens control unit 51 and drives a focus lens. A zoom drive unit 53 changes an angle of view of the interchangeable lens 2 under control of the lens control unit 51. An aperture drive unit 54 adjusts an amount of opening of the aperture under control of the lens control unit 51.

When the interchangeable lens 2 is mounted to the camera body 1, the lens control unit 51 and the control unit 21 in the camera body 1 are able to perform data communication via the contact units 29 and 50. Moreover, power for driving a motor and an actuator inside of the interchangeable lens 2 is supplied through the contact units 29 and 50. Optical information specific to the lens, information relating to a subject distance based on a distance encoder, and the like, which are needed for the control unit 21 in the camera body 1 to perform focus detection and exposure calculation, are output by data communication from the lens to the control unit 21 in the camera body 1. Further, focus adjustment information obtained as a result of the focus detection and exposure calculation performed by the control unit 21 in the camera body 1, and aperture information are output by data communication from the control unit 21 in the camera body 1 to the lens, and the interchangeable lens 2 controls the aperture in accordance with the focus adjustment information.

Exemplary Embodiment 1

Figure 4:
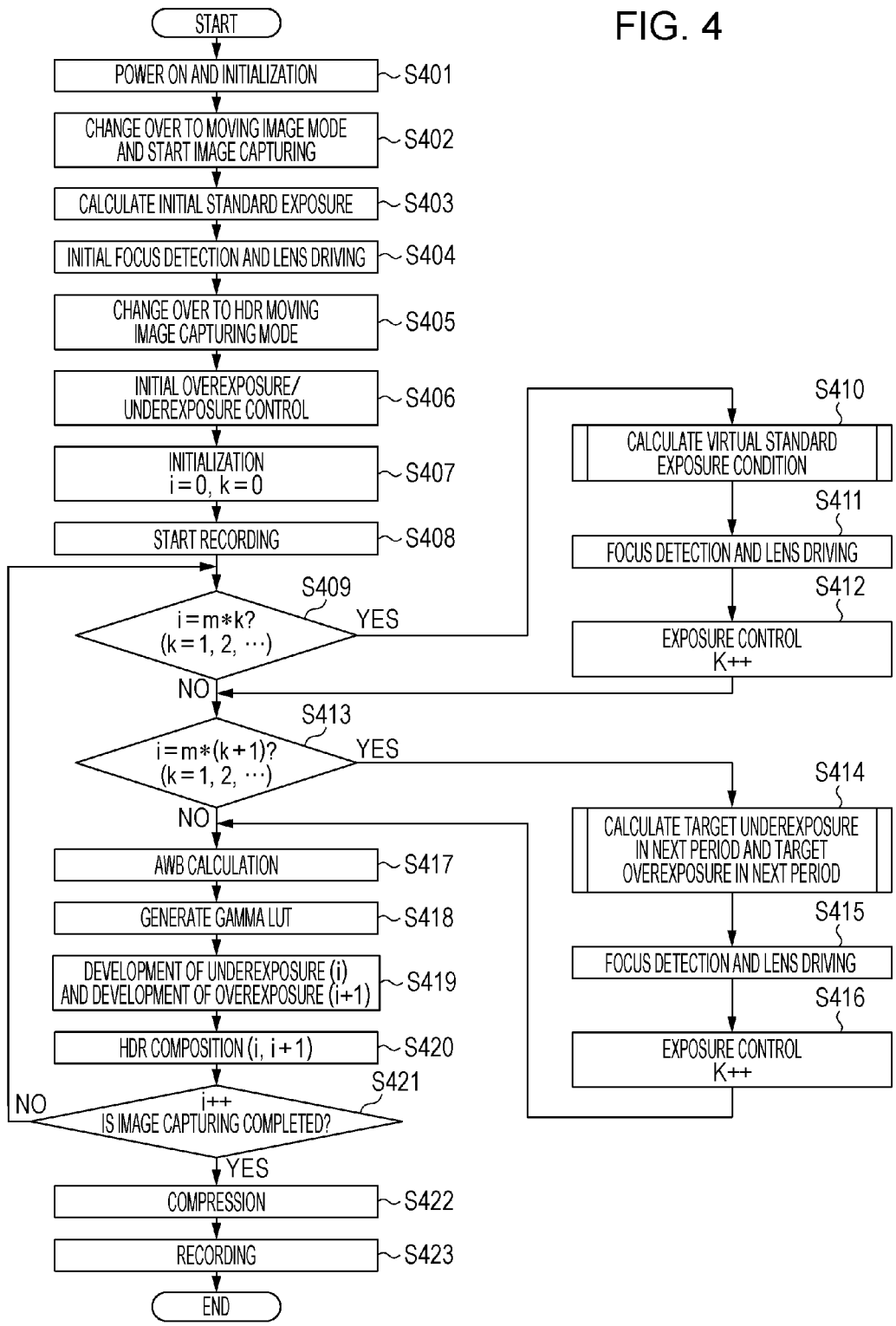
FIG. 4 is a flowchart indicating HDR moving image capturing processing of Exemplary Embodiment 1.
Figure 9:
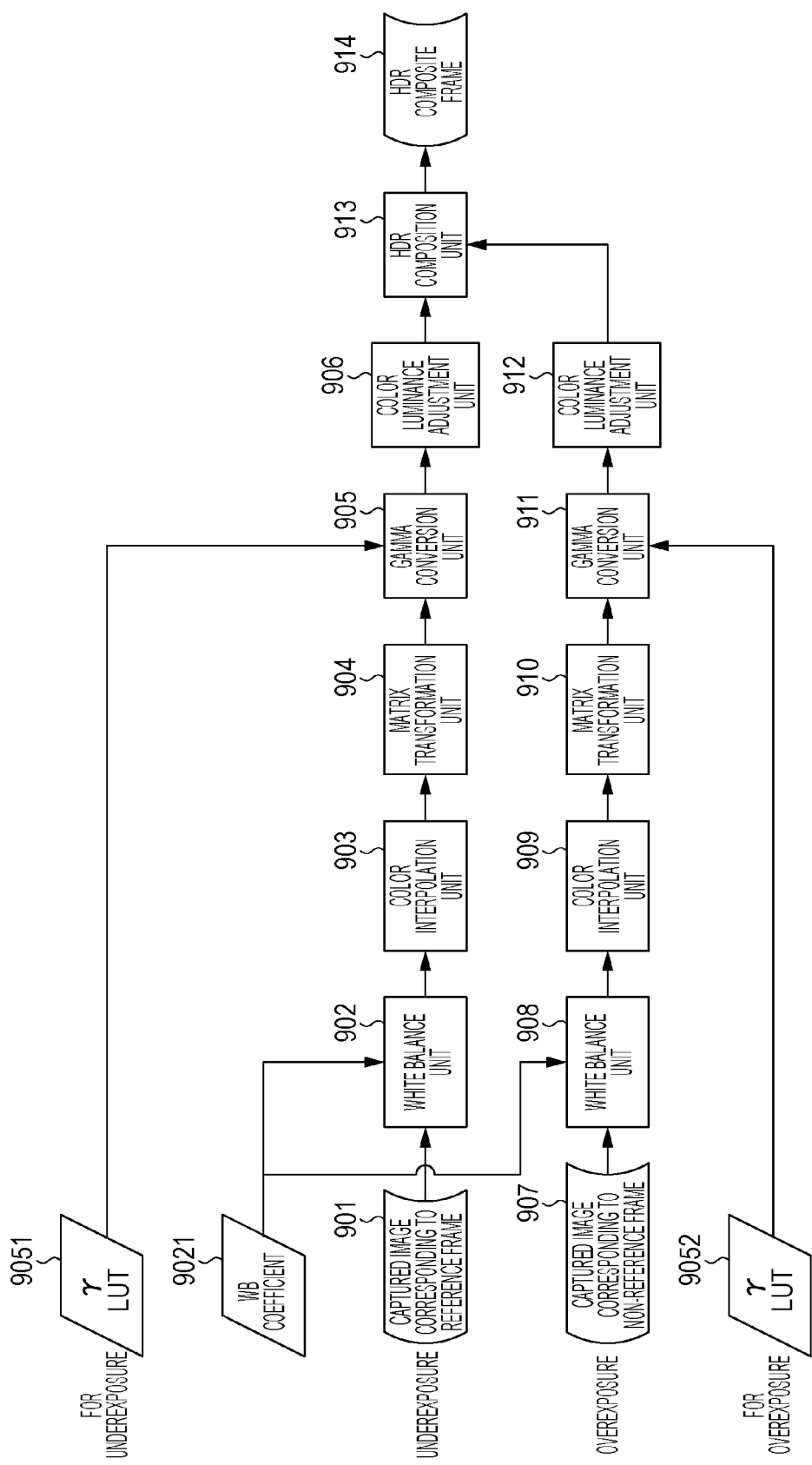
FIG. 9 is a functional block diagram for realizing HDR moving image capturing processing of the present exemplary embodiment.

An operation at a time of HDR moving image capturing of Exemplary Embodiment 1 will be described with reference to a flowchart of FIG. 4. When the control unit 21 is activated, for example, by a power switch included in the operation unit 23 being turned on, processing of FIG. 4 is executed. The flowchart of FIG. 4 indicates procedure of processing which is realized when the control unit 21 controls each of the units of FIG. 2 and executes a function of each block described later in FIG. 9. Specifically, it is processing realized when a program stored in the ROM of the control unit 21 is developed into the RAM and executed by the ALU. The same is applied also to flowcharts of FIG. 10, FIG. 11, and FIG. 15 described later.

At S401, the control unit 21 performs communication with the lens control unit 51 in the interchangeable lens 2, and performs initialization processing for, for example, obtaining various types of lens information needed for focus detection and photometry.

At S402, when changing over to a moving image recording mode is instructed by a switch included in the operation unit 23, the control unit 21 starts an operation for preparing capturing of a moving image.

At S403, the control unit 21 performs initial standard exposure calculation so that an exposure condition is appropriate for a subject with a standard exposure condition as an initial condition. The standard exposure condition in the present exemplary embodiment is an exposure condition under which luminance of the subject in a captured image is target luminance.

At step S404, the control unit 21 performs display of a live-view image (or a through image) causing the display device 27 to function as an electronic viewfinder. The live-view is implemented by raising the main mirror 3 and the first reflection mirror 7, releasing the mechanical shutter 11, and continuously executing image capturing processing with use of a so-called electronic shutter in a state where the image sensor 10 is exposed. Note that, since the mirrors are up in the live-view state, the AE sensor 6 is not able to perform photometry. Thus, the control unit 21 periodically acquires a signal for photometry from the image sensor 10 during the live-view. Specifically, the control unit 21 uses one frame of the live-view image as the image signal for photometry. The control unit 21 performs A/D conversion for the image signal for photometry acquired from the image sensor 10, and then stores the resulting signal in the RAM. A pixel region of the image sensor 10 is divided into 9×7 blocks, for example, as illustrated in FIG. 3, and the image signal is calculated as luminance information for each block by using signals obtained by the pixels included in the block. The luminance information for each block is able to be obtained by averaging luminance values of all pixels in the block, for example. Note that, the calculation of the luminance information is able to be performed, for example, by conversion into By (brightness value) representing subject luminance in an APEX (Additive System of Photographic Exposure). Pieces of projection data Y1 to Y7 and X1 to X9 are calculated on the basis of the luminance information obtained in this manner. In general, a method for converting data in a two-dimensional array having m rows×n columns into data in a one-dimensional array obtained by performing addition or an arithmetic average in a column direction or a row direction is called a projection from two dimensions to one dimension. In addition, data of a one-dimensional array obtained as a result of addition in the column direction or the row direction is called a projection image or projection data. In the present exemplary embodiment, pieces of projection data Y1 to Y7 and X1 to X9 are calculated by using a following formula 1.

$X1 = \Sigma(x1)/7$, where $x=1$ to 7

$X2 = \Sigma(x2)/7$, where $x=1$ to 7

$X3 = \Sigma(x3)/7$, where $x=1$ to 7

$X4 = \Sigma(x4)/7$, where $x=1$ to 7

$X5 = \Sigma(x5)/7$, where $x=1$ to 7

$X6 = \Sigma(x6)/7$, where $x=1$ to 7

$X7=\Sigma(x7)/7$, where $x=1$ to 7

$X8=\Sigma(x8)/7$, where $x=1$ to 7

$X9=\Sigma(x9)/7$, where $x=1$ to 7

$Y1=\Sigma(1y)/9$, where $y=1$ to 9

$Y2=\Sigma(2y)/9$, where $y=1$ to 9

$Y3=\Sigma(3y)/9$, where $y=1$ to 9

$Y4=\Sigma(4y)/9$, where $y=1$ to 9

$Y5=\Sigma(5y)/9$, where $y=1$ to 9

$Y6=\Sigma(6y)/9$, where $y=1$ to 9

$Y7=\Sigma(7y)/9$, where $y=1$ to 9  (Formula 1)

A maximum value Emax is detected from among the calculated projection data Y1 to Y7 and X1 to X9, and a first exposure correction value γ is calculated from the detected maximum value Emax of the pieces of projection data. Specifically, for example, when the value of Emax exceeds a Bv of 10, the first exposure correction value γ is calculated by using a following formula 2.

$\gamma=(Emax-10)\times 0.25$  (Formula 2)

The first exposure correction value γ is used to perform exposure correction in accordance with an experimental rule that it is often desirable for a high-luminance subject having a Bv exceeding 10 to be bright in a captured image. The coefficient 0.25 is merely an example, and it is sufficient that an optimal value is determined in accordance with how bright the high-luminance subject is to appear.

An average Bv in a surface is calculated by using a following formula 3.

$AVEBv=\Sigma(Xx+Yy)/(7\times 9)$  (Formula 3)

where, x=1 to 7 and y=1 to 9

Thus, a control value for the Bv is obtained from a following formula 4.

Standard exposure: $AVEBv+\gamma$  (Formula 4)

Figure 5:
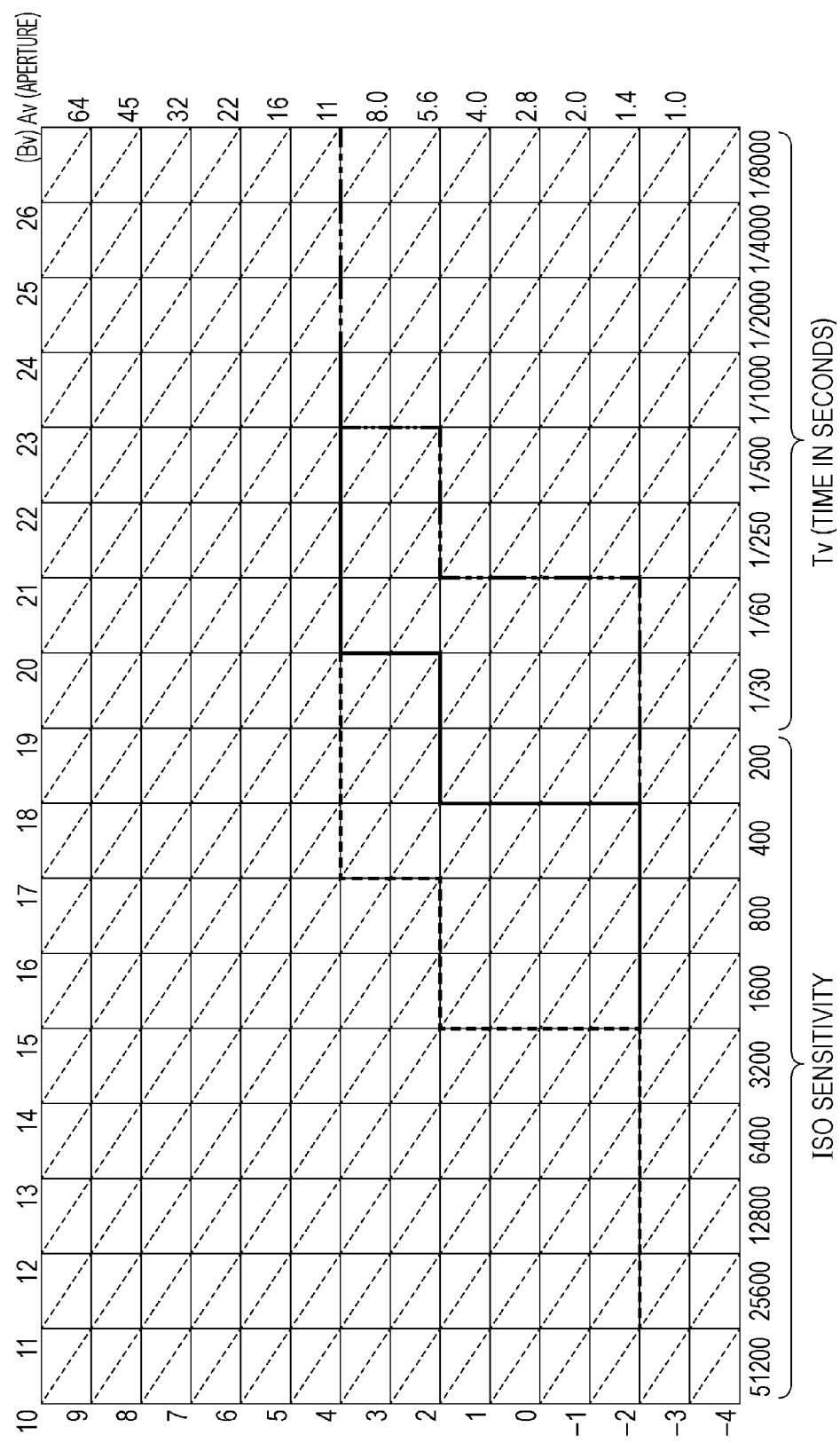
FIG. 5 illustrates a program diagram for HDR moving image capturing.

An exposure condition is determined with reference to a program diagram that has been designed in advance on the basis of the control value corresponding to the Bv. FIG. 5 illustrates a program diagram used in HDR moving image capturing of the present exemplary embodiment. A vertical axis on the right represents an aperture value Av, and a vertical axis on the left and a horizontal axis on the top represent Bv. A horizontal axis on the bottom represents a shutter speed Tv. However, there is a limit on a Tv value depending on a frame rate in a moving image. For example, in a case of 30 fps exemplified in FIG. 5, a slowest shutter speed Tv of an overexposure side is ⅟30 seconds, so that higher exposure side is realized by increasing ISO sensitivity. On the basis of the control value corresponding to the Bv, a standard exposure condition (ISO sensitivity, aperture, and shutter speed) is determined by referring to the program diagram of FIG. 5, and exposure control is performed under the determined condition. Note that, a solid line of FIG. 5 indicates a program diagram in standard exposure.

At S404, the control unit 21 causes the image sensor 10 to perform accumulation of signals for focus detection and performs an initial focusing operation for performing focus detection and lens driving. Note that, the focus detection is not able to be performed by the focus detection sensor 9 because the mirrors are up in the live-view state. Therefore, the control unit 21 performs focus detection processing according to a contrast detection method by using image signals obtained by the image sensor 10. When the accumulation of the signals by the image sensor 10 is finished, the control unit 21 performs A/D conversion for the signals read from the image sensor 10, and stores the resultant signals in the RAM as image signals for focus detection. Further, the control unit 21 calculates focusing states in an imaging plane from the signals for focus detection and lens information obtained at S401, and determines a focus detection region in which focus is to be achieved. Note that, an in-focus position of the focus detection region may be determined by other method. For example, the focus detection region may be designated by a user through the operation unit 23 or the focus detection region may be set on a human face by using an image recognition technique such as face detection. The control unit 21 calculates, on the basis of the focusing state in the focus detection region determined as described above and the lens information, a lens movement amount for achieving focus, controls the focus lens drive unit 52 through the lens control unit 51, and moves the focus lens to the in-focus position. This makes the interchangeable lens 2 focus on a specific subject in the focus detection region. When the focus lens is driven, information of an encoder which detects a movement distance of the lens changes, the control unit 21 also updates various types of lens information of the interchangeable lens 2.

Upon changeover to a HDR moving image capturing mode by a switch included in the operation unit 23, the control unit 21 starts HDR moving image capturing at step S405. In the HDR moving image capturing mode, high dynamic range composition in which a plurality of images captured with different exposures in temporally continuous frames are composited is performed. That is, in the HDR moving image capturing mode, a plurality of images with different exposures are acquired and the plurality of images are composited for each set of composition, thus making it possible to acquire a high dynamic range image having a wider dynamic range of brightness than respective images. For example, image capturing (underexposure image capturing) with underexposure (relatively low exposure) relative to the standard exposure and image capturing (overexposure image capturing) with overexposure (relatively high exposure) relative to the standard exposure are repeated in an alternating manner.

At S406, the control unit 21 performs control (exposure control) associated with exposure for executing initial overexposure image capturing and underexposure image capturing. First, the control unit 21 performs the underexposure image capturing under the exposure condition under which underexposure indicated with a two-dot chain line of FIG. 5 is provided. In the underexposure image capturing as well, similarly to standard exposure calculation, luminance information of each block illustrated in FIG. 3 is acquired, a maximum value Emax is detected from the luminance information of each block, and a luminance difference between the maximum value Emax and an average By obtained as a result of the standard exposure image capturing is calculated as a dynamic range Ds on a bright portion side by using a following formula 5.

$Ds=MaxBv-average\ Bv$  (Formula 5)

Next, the control unit 21 sets the most scene-appropriate underexposure condition on the basis of the calculated dynamic range Ds. If the dynamic range of the image sensor 10 is assumed to be 6 EV and the dynamic range of the higher luminance side relative to the standard exposure is assumed to be 3 EV, a dynamic range Dh from the standard exposure up to the maximum luminance value at which underexposure image capturing is able to be performed is obtained as follows:

Dh=4 EV (when the underexposure is −1 EV relative to the standard exposure)

Dh=5 EV (when the underexposure is −2 EV relative to the standard exposure)

Dh=6 EV (when the underexposure is −3 EV relative to the standard exposure).

The most scene-appropriate underexposure is determined under the condition that Dh is slightly greater than Ds. That is, the most scene-appropriate underexposure is determined as follows:

$$Ds<4\ EV \rightarrow *-1\ EV$$

$$Ds<5\ EV \rightarrow *-2\ EV$$

$$Ds<6\ EV \rightarrow *-3\ EV$$

$$Ds>6\ EV \rightarrow *-4\ EV.$$

Figure 6:
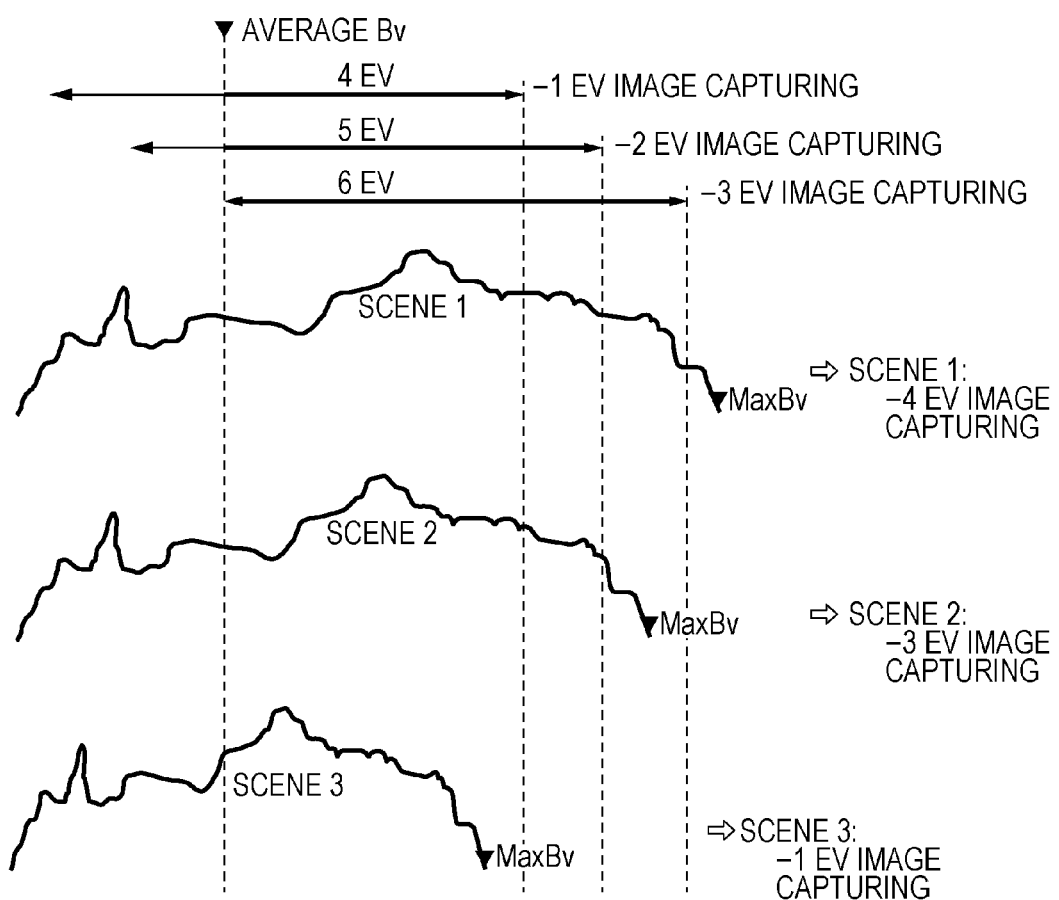
FIG. 6 is an explanatory view of a method for determining an exposure level difference between standard exposure and underexposure.

In FIG. 6, in a scene 1, Ds is greater than 6 EV, and hence image capturing is desired to be performed with −4 EV. In a scene 2, Ds is in a range of 5 EV<Ds<6 EV, and hence image capturing is desired to be performed with −3 EV. In a scene 3, Ds is in a range of 3 EV<Ds<4 EV, and hence image capturing is desired to be performed with −1 EV.

The calculation processing for the underexposure condition as described above is performed similarly for the initial overexposure condition.

At S407 and S408, the control unit 21 initializes a frame number i to a first frame, and starts recording of a moving image at timing when the initial standard exposure, underexposure, and overexposure are determined. After the recording is started, the calculation processing of the standard exposure and the calculation processing of the underexposure and the overexposure are carried out periodically while continuous capturing of two images of an underexposure image and an overexposure image is repeated for each frame. By capturing an image of a subject by such processing each time the exposure is changed, it is possible to continuously and repeatedly acquire a low-exposure image and a high-exposure image whose exposure is relatively high compared to the low-exposure image.

Note that, since the calculation for the exposure control is processing requiring time, the control unit 21 performs the calculation for the exposure control not for each frame but periodically with a period of once per m frames at S409. In the HDR moving image capturing of the present exemplary embodiment, only underexposure image capturing and overexposure image capturing are performed and image capturing with standard exposure is not performed basically, so that the control unit 21 calculates a virtual standard exposure condition at S410 and performs a focusing operation at S411. A method for calculating the virtual standard exposure condition will be described later.

At S412, the control unit 21 updates the exposure conditions of the underexposure image capturing and the overexposure image capturing in accordance with the virtual standard exposure condition, and performs exposure control on the basis of the program diagram of FIG. 5.

At S413 and S414, the control unit 21 calculates (sets) the exposure conditions of the underexposure image capturing and the overexposure image capturing. In this case, at timing after m frames following the calculation of the virtual standard exposure condition (reference exposure) at S410 (S413), target exposure conditions of the underexposure image capturing and the overexposure image capturing in a next period are calculated (S414). A method for calculating (setting) the target exposure conditions of the underexposure image capturing and the overexposure image capturing in the next period will be described later. When the virtual standard exposure condition, and the target exposure conditions of the underexposure image capturing and the overexposure image capturing in the next period are determined, the control unit 21 sets the exposure conditions by performing exposure control on the basis of the program diagram of FIG. 5 (S415).

Figure 10:
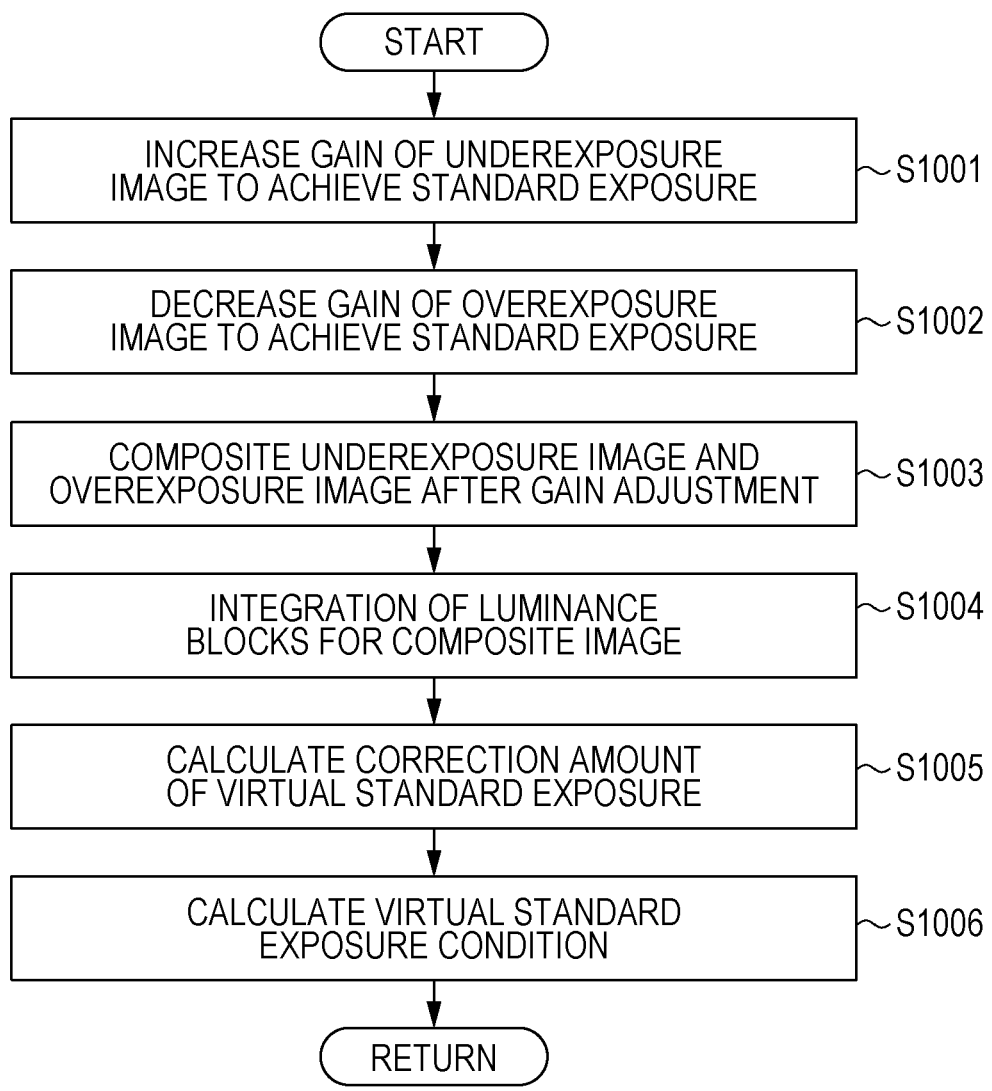
FIG. 10 is a flowchart indicating details of virtual standard exposure calculation processing of FIG. 3.

Here, details of the method for calculating the virtual standard exposure condition (reference exposure) of the next period (after m frames) of S410 will be described with reference to a flowchart of FIG. 10. In the HDR moving image capturing of the present exemplary embodiment, since image capturing under the standard exposure condition is not performed under a condition other than a predetermined condition, luminance information for each block illustrated in FIG. 3, which is equivalent to the case of image capturing under the standard exposure condition, is firstly generated.

At S1001, the control unit 21 performs processing (first image generation) for increasing a correction gain of an image (underexposure image) captured with underexposure so that the image has standard exposure (first reference exposure). For the standard exposure condition in this case, the exposure condition calculated in the current frame (that is, the virtual standard exposure condition calculated in a previous period (m frames before) is used. The standard exposure condition acquired by the initial standard exposure calculation (S403) is used for the first period. Similarly, at S1002, the control unit 21 performs processing (second image generation) for decreasing a correction gain of an image (overexposure image) captured with overexposure so that the image has the standard exposure (first reference exposure) in the current frame. At S1003, the control unit 21 composites the underexposure image and the overexposure image which are subjected to gain adjustment to achieve the standard exposure. There are some methods as a composition method in this case, but averaging for each pixel is performed in the present exemplary embodiment.

The control unit 21 acquires luminance information of each block illustrated in FIG. 3 for the composite image at S1004. As the luminance information of each block, a similar result to a case of image capturing with the standard exposure is obtained because both of the underexposure image and the overexposure image are subjected to gain adjustment so as to achieve the standard exposure, and a dynamic range equivalent to a dynamic range in a case of image capturing of one image is also obtained.

Then, the control unit 21 calculates, a correction amount of virtual standard exposure in a frame after m frames, which corresponds to a frame when an image of the subject is captured later, with a similar method to the standard exposure calculation acquired at S403 for the luminance information of each block (S1005), and determines a virtual standard exposure condition (second reference exposure) in the frame after m frames in accordance with the solid line in the program diagram of FIG. 5 (S1006).

Figure 11:
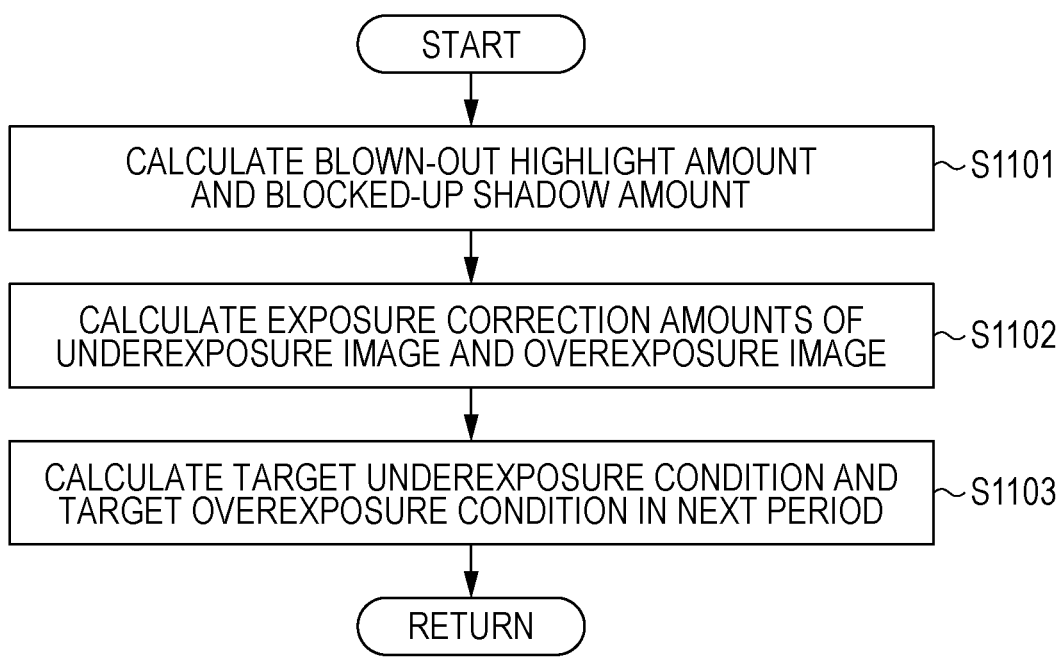
FIG. 11 is a flowchart indicating details of target exposure calculation processing of FIG. 3.
Figure 12A:
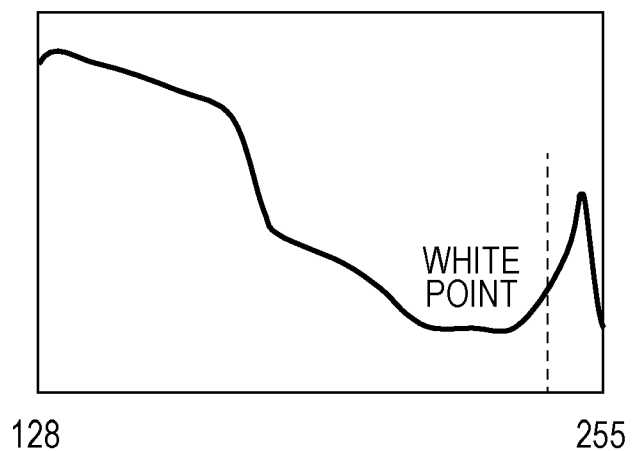
FIGS. 12A and 12B each illustrates a blown-out highlight region and a blocked-up shadow region in a luminance histogram.
Figure 12B:
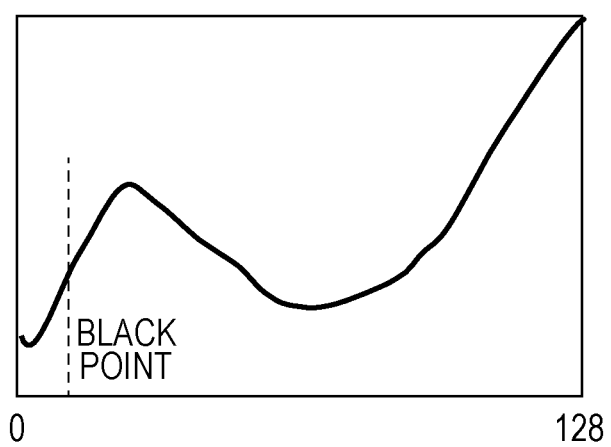

Next, a method for determining target exposure conditions of underexposure image capturing and overexposure image capturing in a next period (after m frames) at S414 will be described in detail with reference to a flowchart of FIG. 11. The method for determining the underexposure and the overexposure is based on a concept that neither blown-out highlight nor blocked-up shadow is generated. Thus, the control unit 21 firstly calculates a blown-out highlight amount of the underexposure image and a blocked-up shadow amount of the overexposure image (S1101). FIG. 12A illustrates a histogram representing luminance distribution of a bright portion of the underexposure image and FIG. 12B illustrates a histogram representing luminance distribution of a dark portion of the overexposure image. FIG. 12A illustrates an example of a signal after gamma conversion in which a luminance level of the virtual standard exposure is 128 LSB, but the signal may be a linear signal before gamma conversion. Note that, gamma table generation processing at S418 of FIG. 4 will be described later. A current blown-out highlight amount SatBR is calculated by a following formula 6, in which luminance regarded as a blown-out highlight is set as a white point and a luminance value of, for example, 95% is set.

$$SatBR=SatBRNum/TotalBRNum \quad \text{(Formula 6)}$$

The SatBRNum indicates a number of pixels of the blown-out highlight and the TotalBRNum indicates a total number of pixels of the bright portion. Similarly, a current blocked-up shadow amount SatDK is calculated by using a following formula 7 from the histogram representing the luminance distribution of the dark portion of the overexposure image of FIG. 12B, in which luminance regarded as a blocked-up shadow in FIG. 12B is set as a black point.

$$SatDK=SatDKNum/TotalDKNum \quad \text{(Formula 7)}$$

The SatDKNum indicates a number of pixels of the blocked-up shadow and the TotalDKNum indicates a total number of pixels of the dark portion.

The control unit 21 calculates an exposure correction amount in accordance with the blown-out highlight amount of the underexposure image and the blocked-up shadow amount of the overexposure image obtained as described above (S1102). The exposure correction amount is set to +1 EV, for example, when the blown-out highlight amount SatBR is in a range of 0 to a threshold th1, +2 EV when it is a threshold th2 or more, and −1 EV when it is less than 0.

At S1103, the control unit 21 adds the exposure correction amount set at S1102 to the current underexposure condition to acquire an underexposure condition in the next period. Similarly, an overexposure condition in the next period is acquired. Note that, reflection of 100% of the exposure correction amount in the frame of the next period after m frames gives a sudden change so that displeasing appearance is caused as a blinking phenomenon. Thus, the exposure correction amount is reflected gradually. For example, in a case of m=4, control is performed in a stepwise manner so that 25% of the exposure correction value is reflected in a first frame, 50% is reflected in a second frame, and 100% is reflected in a fourth frame.

With reference back to FIG. 4, AWB (automatic white balance) calculation processing of S417 and processing for generating a gamma LUT (lookup table) for gamma conversion of S418 will be described later.

The control unit 21 performs development processing of the underexposure image and the overexposure image at S419. Here, the development processing will be described in detail with reference to FIG. 9. A subject image is formed on the image sensor 10 by an image forming optical system (lens). The image sensor 10 is, for example, a single-panel color image sensor provided with an ordinary primary-color filter. The primary-color filter is composed of three types of color filters that have transmissive dominant wavelength bands near 650 nm, 550 nm, and 450 nm, respectively, and captures color planes corresponding to R (red), G (green), and B (blue) bands. In the single-panel color image sensor, the color filters are spatially arrayed in each of pixels, and each pixel can only obtain single intensity on a single color plane. Accordingly, the image sensor 10 outputs an underexposure image (reference frame) 901 and an overexposure image (non-reference frame) 907 in each of which pixels of each color are arranged in a mosaic pattern. White balance units 902 and 908 perform color processing for setting a white one to be closer to white. Specifically, RlB data of pixels constituting image data is plotted in a predetermined color space, for example, such as an x-y color space, and R, G, and B of data plotted near a black-body radiation locus, which has a high possibility of representing a color of a light source in that color space, are integrated, and then, white balance coefficients G/R and G/B for R and B components are calculated from the obtained integrated value. When capturing of a standard exposure image is repeated as in a normal moving image, a white balance coefficient for a standard exposure image is generally calculated. However, in the HDR moving image capturing of the present exemplary embodiment, only an underexposure image and an overexposure image are captured, so that the white balance coefficient may be calculated by using the underexposure image having a small amount of the blown-out highlight. White balance processing is executed by using a white balance coefficient 9021 generated by the processing above.

Color interpolation units 903 and 909 respectively apply color interpolation processing to the underexposure image (reference frame) 901 and the overexposure image (non-reference frame) 907 to thereby generate color images in which every pixel has complete R, G, and B color information. Basic color images are generated from the generated color images by matrix transformation units 904 and 910 and gamma conversion units 905 and 911. The gamma conversion units 905 and 911 perform gamma conversion processing by using one-dimensional gamma Lutes generated at S418. The gamma conversion units 905 and 911 respectively perform the gamma conversion processing by using a gamma LUT 9051 for underexposure for the underexposure image and using a gamma LUT 9052 for overexposure for the overexposure image.

With reference back to FIG. 4, the gamma LUT generation processing at S418 will be described in detail.

Figure 7:
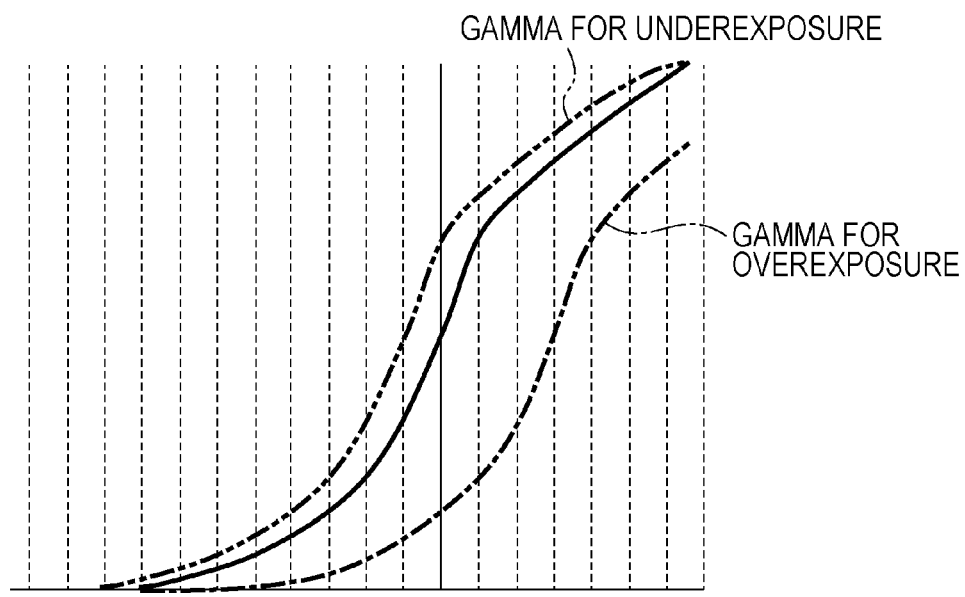
FIG. 7 illustrates a gamma table used for development processing of an underexposure image and an overexposure image.

At S418, the control unit 21 generates gamma Lutes so that each of the underexposure image and the overexposure image has a corresponding virtual standard exposure condition. A solid line indicated in FIG. 7 illustrates a gamma LUT corresponding to a case where image capturing is performed with the standard exposure. A horizontal axis represents a linear input signal, which becomes a non-linear output signal after gamma conversion. For example, when the underexposure image is captured with −1 EV relative to the standard exposure, the control unit 21 generates the gamma LUT 9051 having a feature of increasing the exposure by 1 EV as illustrated with a two-dot chain line. In this case, when the exposure is increased simply, tones of high luminance which have remained without being saturated because of image capturing with underexposure are lost, so that it is important to make the feature close to a feature of a gamma LUT for standard exposure image capturing as luminance becomes high. Similarly, for example, when the overexposure image is captured with +3 EV relative to the standard exposure, the control unit 21 generates the gamma LUT 9052 having a feature of decreasing the exposure by 3 EV as illustrated with a one-dot chain line of FIG. 7. In this case as well, it is necessary to make the feature close to the feature of the gamma LUT for standard exposure image capturing as luminance becomes low so that tones of a dark portion are remained. After that, color luminance adjustment units 906 and 912 perform processing for improving appearances of the images, for example, image correction for enhancing color saturation through detection of an evening view in accordance with a scene. When the processing by the color luminance adjustment units 906 and 912 is finished, the development processing is completed.

Figure 8:
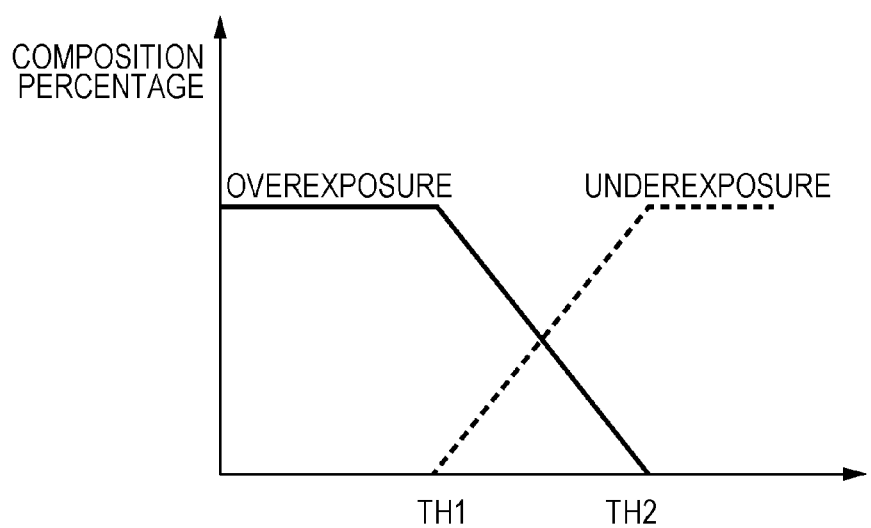
FIG. 8 illustrates a composite percentage of images in HDR moving image capturing.

At S420, since both of the underexposure image and the overexposure image after the gamma conversion have the standard exposure, by performing weighted addition in accordance with a predefined composition percentage as illustrated in FIG. 8, a HDR moving image frame having a feature that tones are connected smoothly is generated. In FIG. 8, a horizontal axis represents reference luminance and a vertical axis represents a composition percentage. The overexposure image is used for a region darker than a threshold TH1 for the reference luminance at the time of composition and the underexposure image is used for a region brighter than a threshold TH2 for the reference luminance at the time of composition. Further, changeover between images can be smoothed by gradually changing the composition percentage in an intermediate region between vicinities of borders by the thresholds TH1 and TH2 for the reference luminance at the time of composition. A reference frame is used as reference luminance and is an underexposure image frame in the present exemplary embodiment.

The control unit 21 repeatedly performs the aforementioned processing S409 to S420 until image capturing is completed (S421). A trigger for completion of the image capturing is generally pressing of a REC button by a user through the operation unit 23 of FIG. 2. As another example, the completion is also triggered when a completion command is transmitted by, for example, error processing that a recording medium reaches a limit of a capacity. Upon completion of the image capturing at S421, the control unit 21 compresses a moving image which is accumulated in the memory 28 and subjected to HDR image capturing (S422), and records the resultant in a recording medium (S423), followed by completion of the HDR moving image capturing.

Figure 13:
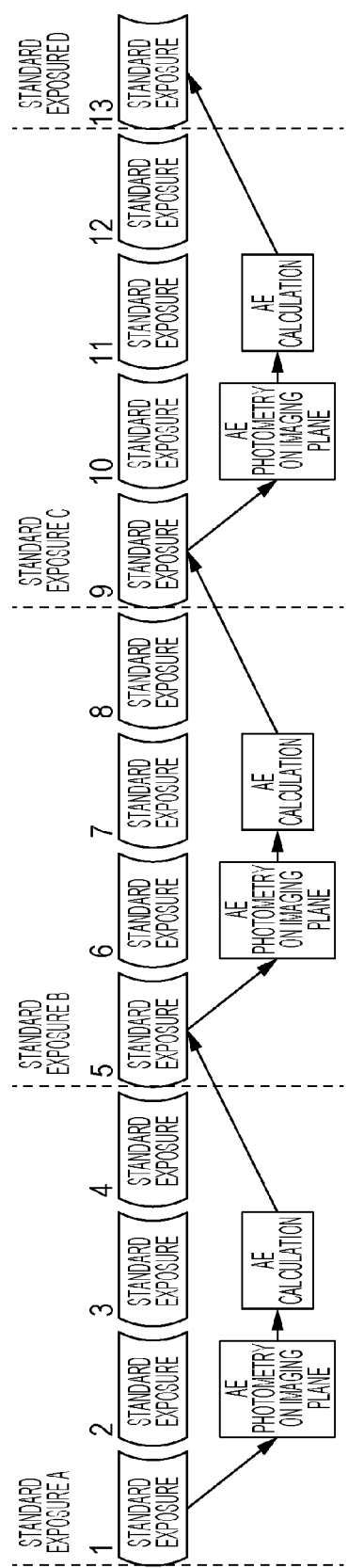
FIG. 13 illustrates timing of automatic exposure control and standard exposure calculation in normal moving image capturing.
Figure 14:
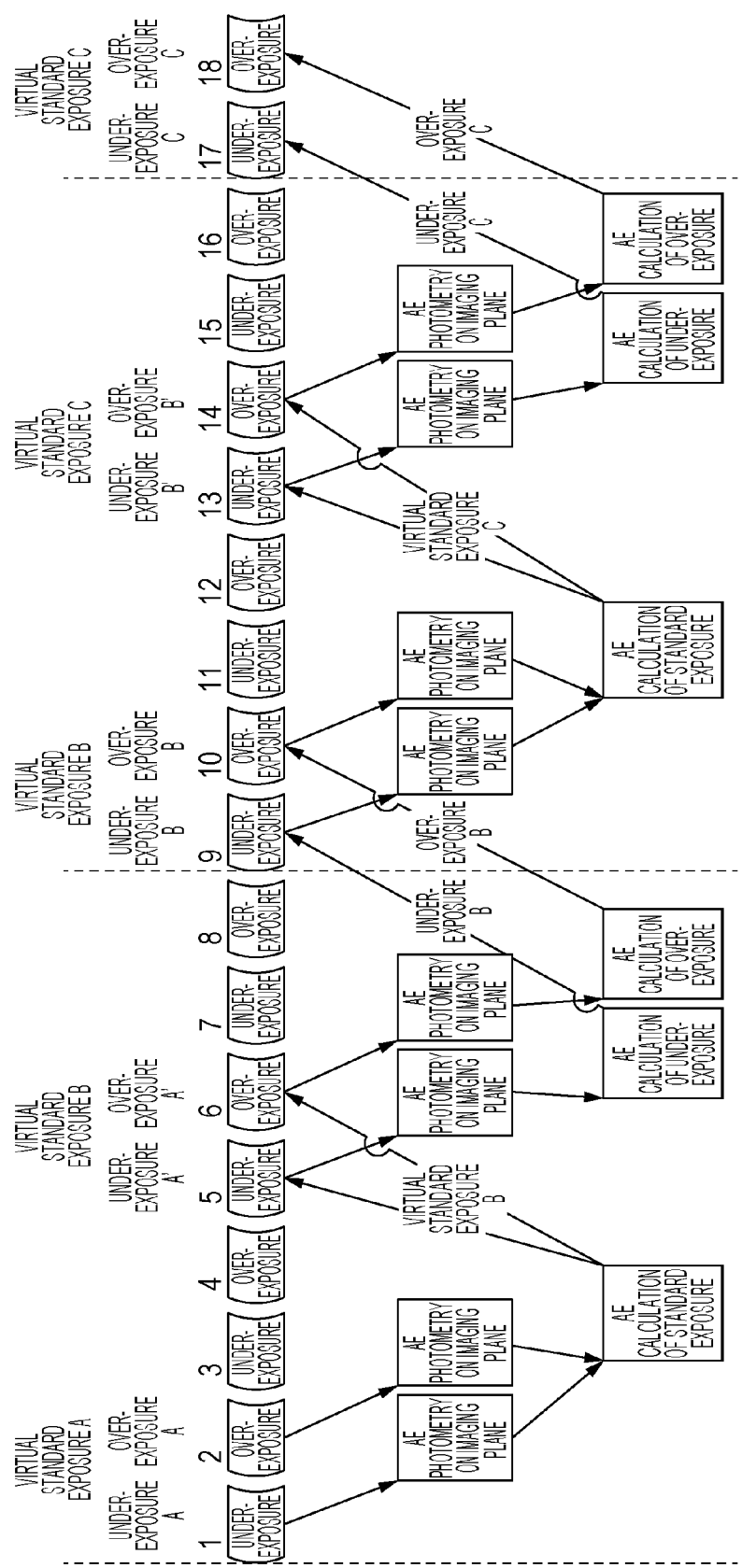
FIG. 14 illustrates timing of automatic exposure control and target exposure calculation in HDR moving image capturing.

According to Exemplary Embodiment 1 described above, in the HDR moving image capturing in which standard exposure image capturing is not performed under a condition other than a predetermined condition (for example, before acquisition of a HDR moving image) and two images of an underexposure image and an overexposure image are composited, automatic exposure control by which a result equivalent to a result of a normal moving image which is not HDR is obtained is performed and blown-out highlights and blocked-up shadows are able to be reduced appropriately. Note that, in comparison with timing of updating an exposure condition of a normal moving image, which is illustrated in FIG. 13, timing of updating an exposure condition of the present exemplary embodiment is as illustrated in FIG. 14. In FIG. 14, each numeral indicates a frame number and the leftmost standard exposure is a first frame. A dotted line is used to indicate division according to a period of updating the exposure condition. While one period of the normal moving image of FIG. 13 has four frames, one period of an example of FIG. 14 has eight frames. Here, when a virtual standard exposure condition is updated (a result of AE calculation of standard exposure of a frame 4 of FIG. 13), exposure conditions of underexposure image capturing and overexposure image capturing change in frames 5 and 6 in a second period compared to frames 1 and 2 in the first period, and on the basis of a result of photometry under such a state (frames 6 and 7), calculation for photometry of underexposure image capturing and overexposure image capturing is performed (frames 7 and 8). Thus, though a response speed of exposure control is reduced compared to that of a normal moving image, photometry calculation is performed in underexposure image capturing and overexposure image capturing in consideration of a variation of standard exposure, so that exposure control which accurately adapts a change of a scene is able to be performed.

Exemplary Embodiment 2

Next, Exemplary Embodiment 2 will be described. In Exemplary Embodiment 1, calculation of a virtual standard exposure condition and calculation of target exposure conditions of underexposure and overexposure are performed in an alternating manner in each period (m frames). On the other hand, in Exemplary Embodiment 2, calculation of a virtual standard exposure condition and calculation of target exposure conditions of underexposure and overexposure are performed simultaneously.

Figure 15:
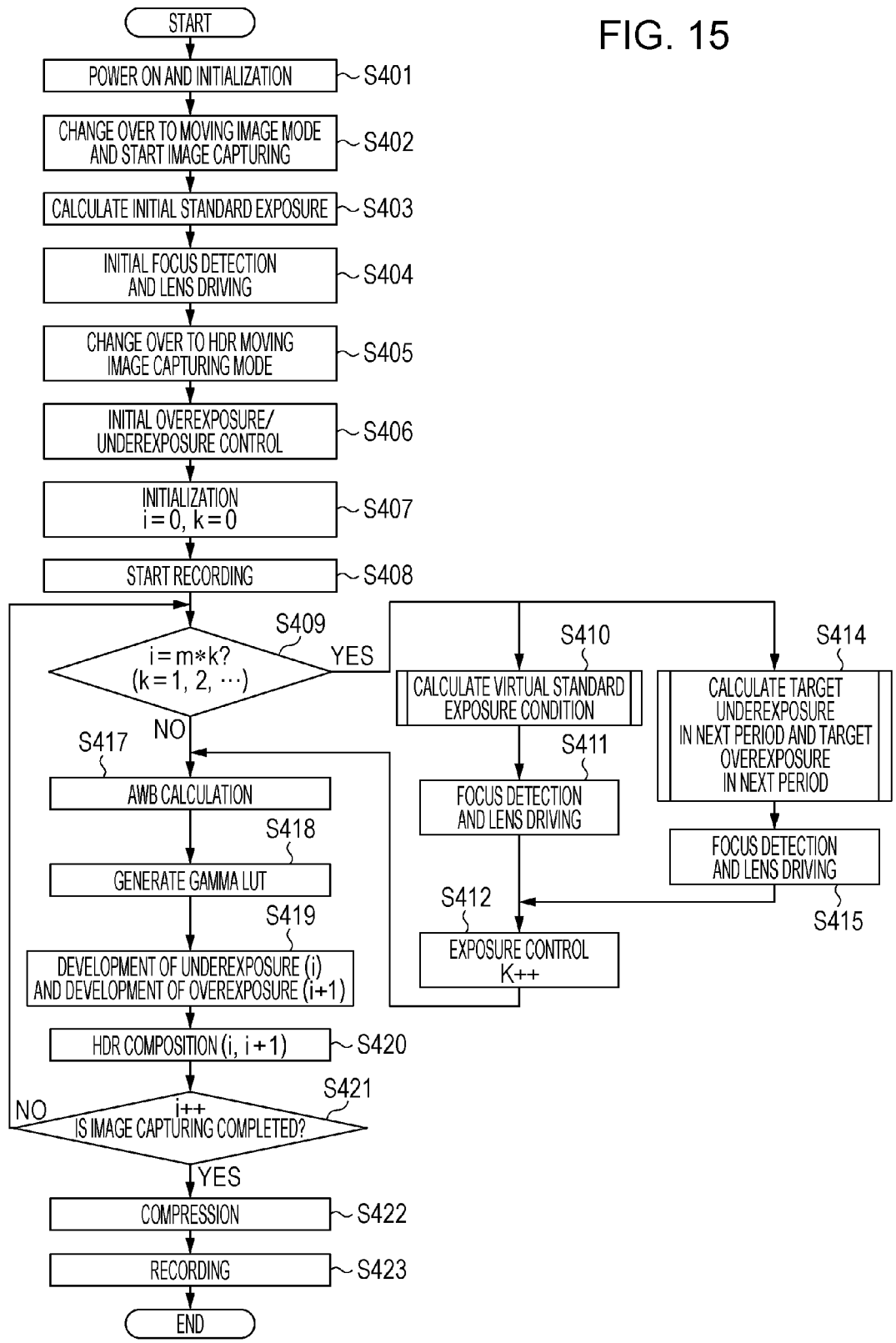
FIG. 15 is a flowchart indicating HDR moving image capturing processing of Exemplary Embodiment 2.

A specific operation of the present exemplary embodiment will be described with reference to a flowchart of FIG. 15. Note that, the same procedure and processing content as those of FIG. 1 are denoted with the same step numbers and description thereof will be omitted, and different points will be mainly described.

In the present exemplary embodiment, at timing of the m-th frame (S409), calculation of a virtual standard exposure condition (S410) and calculation of a target underexposure condition in a next period and a target overexposure condition in the next period (S414) are separately performed in parallel. Here, the virtual standard exposure condition is updated (a result of photometry calculation with standard exposure of a frame 4 of FIG. 16). Differently from Exemplary Embodiment 1, at the same time, the underexposure condition and the overexposure condition are also updated (a result of photometry calculation in underexposure image capturing of a frame 3 and a result of photometry calculation in overexposure image capturing of a frame 4). These results are reflected in next underexposure image capturing and overexposure image capturing simultaneously (frames 5 and 6).

Figure 16:
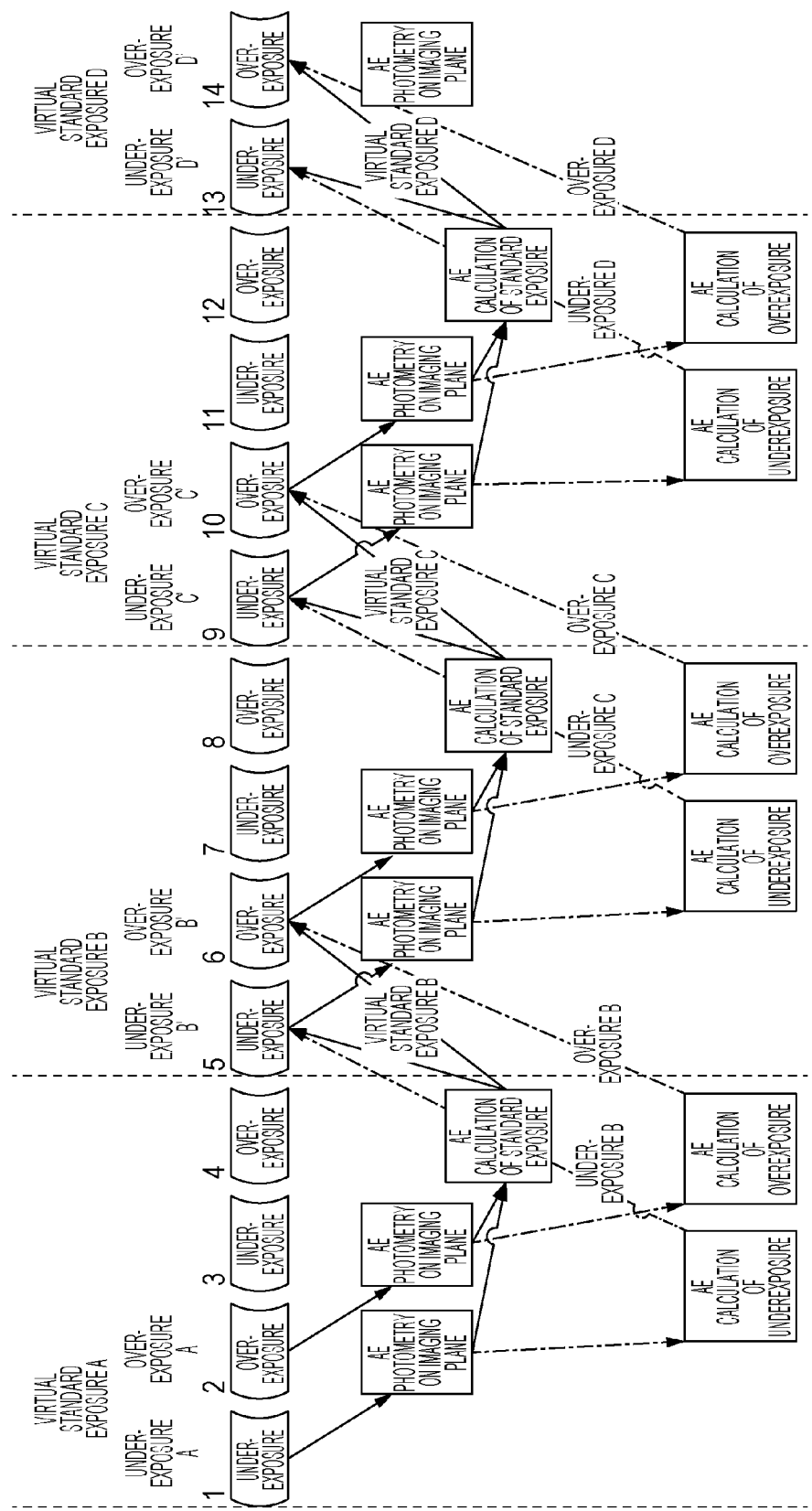
FIG. 16 illustrates timing of automatic exposure control and target exposure calculation in HDR moving image capturing of Exemplary Embodiment 2.

With the processing above, the virtual standard exposure condition, the underexposure condition, and the overexposure condition in the next period are updated at the same timing as illustrated in FIG. 16, so that a response speed of exposure control becomes fast compared to Exemplary Embodiment 1. On the other hand, since the previous virtual standard exposure condition is premised in the photometry calculation of the underexposure image capturing and the overexposure image capturing, accuracy is deteriorated compared to that of Exemplary Embodiment 1. Thus, Exemplary Embodiment 2 provides a control method suitable particularly for a subject which moves at high speed.

Exemplary Embodiment 3

Next, Exemplary Embodiment 3 will be described. In Exemplary Embodiments 1 and 2, a simple averaging method is used when compositing an underexposure image and an overexposure image after gain adjustment in processing for calculating the virtual standard exposure condition at S1003 of FIG. 10. On the other hand, in Exemplary Embodiment 3, composition is performed by using weighted addition with weighting according to an exposure difference between underexposure and overexposure relative to a virtual standard exposure condition in a previous period. Moreover, when determining target exposure conditions of underexposure image capturing and overexposure capturing in a next period, a limit is provided in an exposure difference between underexposure and overexposure.

In the present exemplary embodiment, since the target exposure conditions of the underexposure and the overexposure are separately determined, the target exposure conditions are not always symmetrical, for example, such as −3 EV and +3 EV relative to the virtual standard exposure condition and may be asymmetrical such as −1 EV and +3 EV. In this case, if a result close to the result obtained by image capturing with standard exposure (0 EV) is to be obtained, an image capturing result which is closer to the standard exposure as much as possible is desired to be considered as important. This is because, when image capturing is performed under an exposure condition far from the standard exposure, linearity of the image sensor gradually degrades to cause a bad influence on color reproduction or the like. Thus, weighting according to an exposure difference from the standard exposure is performed by using a following formula 8.

$$W\_DK = 2^{DrangeBR}/(2^{DrangeDK} + 2^{DrangeBR})$$
$$W\_BR = 2^{DrangeDK}/(2^{DrangeDK} + 2^{DrangeBR})$$ (Formula 8)

Figures 17, 18:
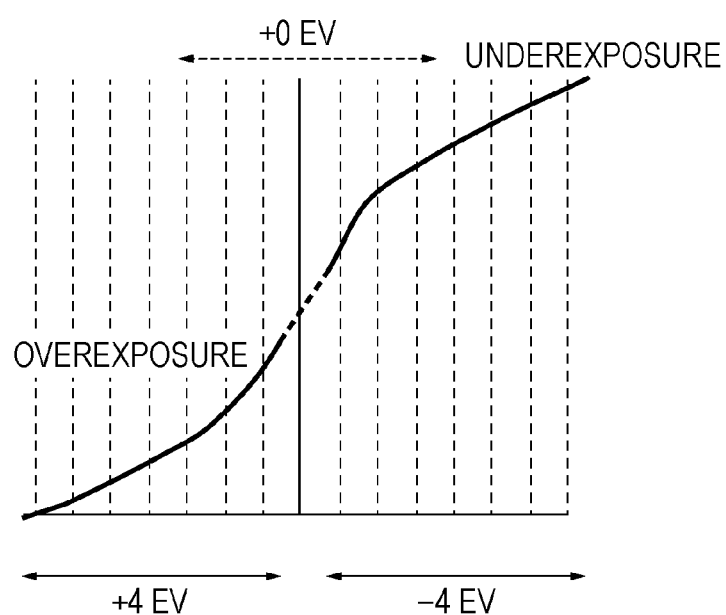
FIG. 17 illustrates weighting coefficients when an underexposure image and an overexposure image are weighted and composited in HDR moving image capturing of Exemplary Embodiment 3.
FIG. 18 illustrates tone characteristics when an exposure difference between underexposure and overexposure is great.

In the formula, W_DK represents a weighting coefficient of the underexposure, DrangeBR represents an exposure difference between the virtual standard exposure and the underexposure, and DrangeDK represents an exposure difference between the virtual standard exposure and the overexposure. FIG. 17 illustrates specific weighting coefficients. For example, in the case of −1 EV and +3 EV, the weighting coefficient of the underexposure is 0.8 and the weighting coefficient of the overexposure is 0.2. After performing weighted addition by using the weighting coefficients obtained in this manner, processing subsequent to S1004 of FIG. 10 is performed similarly to Exemplary Embodiment 1 to calculate the virtual standard exposure condition.

Here, an example in which the weighting coefficient calculated as described above is used when the target exposure conditions of the underexposure image capturing and the overexposure image capturing in the text period are determined will be described.

A limit (limiter) is provided in an exposure difference between the underexposure and the overexposure as an assumption. As described above, the target exposure conditions of the underexposure image capturing and the overexposure image capturing are separately determined in the present exemplary embodiment. Thus, when the underexposure condition and the overexposure condition are determined so as to suppress blown-out highlights and blocked-up shadows in a scene having a great brightness difference, the exposure difference exceeds a dynamic range of the image sensor in some cases. For example, in a case where the underexposure and the overexposure are respectively set as −4 Ev and +4 EV when the dynamic range of the image sensor is set as 6 EV, an intermediate tone signal is dropped during composition if there is no standard exposure image as illustrated in FIG. 18, thus giving an unnatural depiction. Therefore, a horizontal axis indicates a linear input signal and a vertical axis indicates a nonlinear signal after gamma conversion in FIG. 18. An exposure adjustment amount AdjustVal when the determined limiter DrangeLimit is exceeded is calculated by a following formula 9.

$$\text{AdjustVal} = \{(DrangeBR_{k+m} - DrangeDK_{k+m}) - \text{DrangeLimit}\}/2$$ (Formula 9)

After the target exposure conditions of the underexposure image capturing and the overexposure image capturing in the next period are calculated, final target exposure conditions of the underexposure image capturing and the overexposure image capturing are determined by a following formula 10.

$$DrangeDK_{k+m} = DrangeDK_k - \text{AdjustVal} \times W\_D-$$
$$KDrangeBR_{k+m} = DrangeBR_k + \text{AdjustVal} \times W\_BR$$ (Formula 10)

Then, by further finely adjusting the exposure adjustment amount AdjustVal with the weighting coefficient obtained as described above, it is possible to keep the exposure condition closer to the virtual standard exposure condition.

According to Exemplary Embodiment 3 described above, weighted addition in which image capturing closer to the virtual standard exposure condition between the underexposure image capturing and the overexposure image capturing is considered as important when the virtual standard exposure condition is calculated is performed. Thereby, a result of luminance block integration closer to the standard exposure image capturing is obtained and the virtual standard exposure condition closer to a normal moving image is able to be obtained. By providing the limiter in the exposure difference between the underexposure and the overexposure, it is possible to achieve an effect of preventing an intermediate tone signal from being dropped during HDR composition.

While the disclosure has been described with reference to exemplary embodiments, it is to be understood that the invention is not limited to the exemplary embodiments and various modifications and alternations may be made within the scope of the invention. For example, a virtual standard exposure condition is obtained based on both of an underexposure image and an overexposure image in order to acquire information of a bright portion and a dark portion (blown-out highlight/blocked-up shadow regions) in a screen, which is substantially equal to an actual standard exposure image, in the exemplary embodiments described above, but there is no limitation thereto. For example, it may be configured so that a virtual standard exposure condition is obtained based on at least one of an underexposure image and an overexposure image. To describe specifically, when a percentage of a blown-out highlight region in an angle of view is greater than that of a blocked-up shadow region, the virtual standard exposure condition is obtained on the basis of the underexposure image. When a percentage of a blocked-up shadow region in an angle of view is greater than that of a blown-out highlight region, the virtual standard exposure condition is obtained on the basis of the overexposure image. That is, it may be configured so that the virtual standard exposure condition is obtained on the basis of information about one of the underexposure image and the overexposure image in consideration of a balance of brightness and darkness in the angle of view.

However, when such a configuration is adopted, reproducibility of the bright portion and the dark portion in the virtual standard exposure condition may be deteriorated. Accordingly, a configuration in which, for example, when a percentage of a blown-out highlight amount or a blocked-up shadow amount is equal to or more than a predetermined threshold, a virtual standard exposure condition is calculated on the basis of any one of image data is desired to be adopted.

Other Exemplary Embodiments

An exemplary embodiment can be implemented by supplying a program for implementing one or more of the functions of the aforementioned exemplary embodiments to a system or an apparatus via a network or a recording medium, and reading and executing the program by one or more processors in a computer of the system or apparatus. An exemplary embodiment can be implemented by a circuit (for example, ASIC) that implements one or more of the functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-244391, filed Dec. 15, 2015, which is hereby incorporated by reference herein in its entirety.

What is claimed is:

1. An image capturing apparatus that repeatedly acquires a plurality of images used for high dynamic range composition and having different exposures, the image capturing apparatus comprising:
at least one processor that operates to:
capture a subject in order to continuously and repeatedly acquire a low-exposure image and a high-exposure image whose exposure is relatively high compared to the low-exposure image;
generate a first image obtained by correcting the low-exposure image on a basis of a first reference exposure and a second image obtained by correcting the high-exposure image on a basis of the first reference exposure; and
set exposure conditions of a low-exposure image and a high-exposure image whose exposure is relatively high compared to the low-exposure image, which are used for performing image capturing of the subject later, on a basis of the first image and the second image.

2. The image capturing apparatus according to claim 1, wherein the at least one processor further operates to:
calculate a second reference exposure, which is used for performing image capturing of the subject later, on a basis of the first image and the second image, and
wherein the at least one processor sets exposure conditions of a low-exposure image and a high-exposure image whose exposure is relatively high compared to the low-exposure image, which are used performing for image capturing of the subject later, on a basis of the calculated second reference exposure.

3. The image capturing apparatus according to claim 2, wherein the at least one processor generates, on a basis of the second reference exposure calculated in accordance with the first image and the second image that are acquired in a first period, the first image and the second image in a second period after the first period.

4. The image capturing apparatus according to claim 2, wherein
the at least one processor further operates to execute the calculating and the setting periodically for each predetermined frame.

5. The image capturing apparatus according to claim 2, wherein
the at least one processor further operates to execute the calculating and the setting alternately.

6. The image capturing apparatus according to claim 2, wherein
the at least one processor further operates to execute the calculating and the setting in parallel.

7. The image capturing apparatus according to claim 1, wherein
the at least one processor sets exposure conditions of a low-exposure image and a high-exposure image whose exposure is relatively high compared to the low-exposure image, which are used for performing image capturing of the subject later, on a basis of a composite image of the first image and the second image.

8. The image capturing apparatus according to claim 7, wherein
the at least one processor further operates to composite the first image and the second image by performing weighted addition with weighting according to an exposure difference between the low exposure and the first reference exposure and an exposure difference between the high exposure and the first reference exposure.

9. The image capturing apparatus according to claim 1, wherein
the at least one processor provides a limit in an exposure difference between exposure of the low-exposure image and the first reference exposure and an exposure difference between exposure of the high-exposure image and the first reference exposure to set exposure conditions of a low-exposure image and a high-exposure image whose exposure is relatively high compared to the low-exposure image, which are used for performing image capturing of the subject later.

10. The image capturing apparatus according to claim 1, wherein
the first reference exposure is a standard exposure, wherein
exposure of the low-exposure image is an underexposure relative to the standard exposure, and wherein exposure of the high-exposure image is an overexposure relative to the standard exposure.

11. The image capturing apparatus according to claim 1, wherein
the at least one processor generates the first image by increasing a correction gain of the low-exposure image and generates the second image by decreasing a correction gain of the high-exposure image.

12. The image capturing apparatus according to claim 1, wherein the at least one processor further operates to:
develop the acquired low-exposure image and the acquired high-exposure image; and
execute composition by using the low-exposure image and the high-exposure image, which are subjected to the development processing, for the high dynamic range composition.

13. The image capturing apparatus according to claim 1, wherein
the at least one processor, before recording of a moving image is started, continuously and repeatedly acquires a low-exposure image, an intermediate-exposure image whose exposure is relatively high compared to the low-exposure image, and a high-exposure image whose exposure is relatively high compared to the intermediate-exposure image, and wherein
the first reference exposure is an exposure based on an image obtained by correcting the low-exposure image in accordance with the intermediate-exposure image after the recording of the moving image is started and an image obtained by correcting the high-exposure image in accordance with the intermediate-exposure image after the recording of the moving image is started.

14. The image capturing apparatus according to claim 12, wherein
the at least one processor develops the first image and the second image by executing tone correction for each of the low-exposure image and the high-exposure image so as to represent a tone similar to a tone of the reference exposure.

15. An image capturing apparatus that repeatedly acquires a plurality of images used for high dynamic range composition and having different exposures, the image capturing apparatus comprising:
at least one processor that operates to:
capture a subject in order to continuously and repeatedly acquire a low-exposure image and a high-exposure image whose exposure is relatively high compared to the low-exposure image;
generate a correction image obtained by correcting at least one of the low-exposure image and the high-exposure image on a basis of a reference exposure; and
set exposure conditions of a low-exposure image and a high-exposure image whose exposure is relatively high compared to the low-exposure image, which are used for performing image capturing of the subject later, on a basis of the correction image.

16. A control method for an image capturing apparatus that repeatedly acquires a plurality of images used for high dynamic range composition and having different exposures, the control method comprising the steps of:
capturing a subject in order to continuously and repeatedly acquire a low-exposure image and a high-exposure image whose exposure is relatively high compared to the low-exposure image;
generating a first image obtained by correcting the low-exposure image on a basis of a first reference exposure and a second image obtained by correcting the high-exposure image on a basis of the first reference exposure; and
setting exposure conditions of a low-exposure image and a high-exposure image whose exposure is relatively high compared to the low-exposure image, which are used for performing image capturing of the subject later, on a basis of the first image and the second image.

17. A control method for an image capturing apparatus that repeatedly acquires a plurality of images used for high dynamic range composition and having different exposures, the control method comprising the steps of:
capturing a subject in order to continuously and repeatedly acquire a low-exposure image and a high-exposure image whose exposure is relatively high compared to the low-exposure image,
generating a correction image obtained by correcting at least one of the low-exposure image and the high-exposure image on a basis of a reference exposure, and
setting exposure conditions of a low-exposure image and a high-exposure image whose exposure is relatively high compared to the low-exposure image, which are used for performing image capturing of the subject later, on a basis of the correction image.

18. A non-transitory computer-readable storage medium storing a program for causing a computer to execute a control method for an imaging apparatus that includes a sensor for outputting a signal according to an incident light amount, the control method comprising:
capturing a subject in order to continuously and repeatedly acquire a low-exposure image and a high-exposure image whose exposure is relatively high compared to the low-exposure image;
generating a first image obtained by correcting the low-exposure image on a basis of a first reference exposure and a second image obtained by correcting the high-exposure image on a basis of the first reference exposure; and
setting exposure conditions of a low-exposure image and a high-exposure image whose exposure is relatively high compared to the low-exposure image, which are used for performing image capturing of the subject later, on a basis of the first image and the second image.

19. A non-transitory computer-readable storage medium storing a program for causing a computer to execute a control method for an imaging apparatus that includes a sensor for outputting a signal according to an incident light amount, the control method comprising:
capturing a subject in order to continuously and repeatedly acquire a low-exposure image and a high-exposure image whose exposure is relatively high compared to the low-exposure image,
generating a correction image obtained by correcting at least one of the low-exposure image and the high-exposure image on a basis of a reference exposure, and
setting exposure conditions of a low-exposure image and a high-exposure image whose exposure is relatively high compared to the low-exposure image, which are used for performing image capturing of the subject later, on a basis of the correction image.

* * * * *